United States Patent
Liao

(10) Patent No.: US 6,744,976 B1
(45) Date of Patent: Jun. 1, 2004

(54) HOT AIRFLOW GENERATION DEVICE

(75) Inventor: Benker Liao, Taipei (TW)

(73) Assignee: Benison & Co., Ltd., Taipei (TW)

( * ) Notice: Subject to any disclaimer, the term of this patent is extended or adjusted under 35 U.S.C. 154(b) by 0 days.

(21) Appl. No.: 10/359,258

(22) Filed: Feb. 6, 2003

(51) Int. Cl.[7] ................................................ F24H 3/02
(52) U.S. Cl. ........................................ 392/360; 432/59
(58) Field of Search .......................... 392/360; 432/59, 432/8; 34/224, 225, 231, 625, 626

(56) References Cited

U.S. PATENT DOCUMENTS

| | | | | |
|---|---|---|---|---|
| 4,597,193 A | * | 7/1986 | Kallfass ........................ | 34/224 |
| 5,634,789 A | * | 6/1997 | Nawano et al. ................ | 432/59 |
| 5,895,212 A | * | 4/1999 | Fujikura et al. ............... | 432/59 |
| 5,899,048 A | * | 5/1999 | Havens et al. ................. | 53/442 |
| 6,017,212 A | * | 1/2000 | Fujikura et al. ............... | 432/59 |
| 6,471,510 B1 | * | 10/2002 | Chung et al. ................. | 432/229 |

FOREIGN PATENT DOCUMENTS

JP   0200148128 A  *  2/2001

* cited by examiner

*Primary Examiner*—Edward K. Look
*Assistant Examiner*—Vinod D. Patel
(74) *Attorney, Agent, or Firm*—Rosenberg, Klein & Lee

(57) ABSTRACT

A hot airflow generation device supplies hot airflows toward a heat-shrinkage film wrapping around an article for heating and shrinking the film to form a package on the article. The hot airflow generation device includes a casing defining a channel through which the article wrapped by the heat-shrinkage film is conveyed. A hood is arranged inside the casing and forms air passages with the casing. Each air passage forms an exit opening. The hood includes walls forming an air intake port in communication with the air passages. An air fan is mounted to the hood for drawing air into the air intake port and driving the air into the air passages. Electric heaters are arranged inside the air passages for heating air flowing therethrough. Air that is drawn into the air intake port and driven through the air passages is heated by the heaters and becomes hot airflow that flow toward the article through the exit openings. The air bounces from the article and is drawn into the air intake port and the air passages again for circulation and being heated again. An airflow guide board is rotatably mounted in each air passage for controlling air flow rate and direction through the associated exit opening.

3 Claims, 6 Drawing Sheets

HOT AIRFLOW GENERATION DEVICE

BACKGROUND OF THE INVENTION

1. Field of the Invention

The present invention relates generally to a hot airflow generation device, and in particular to a hot airflow generation device that allows for regulation of flow rate and direction adjustment of air flowing toward an article around which a heat-shrinkage film wraps.

2. The Related Art

Heat-shrinking plastic films have been widely used to wrap and pack consumer products, such as foods, books, video/audio compact disks for protecting the products from contamination and damage. A packaging machine is required to warp the package film around the product and supply hot airflow to heat the plastic film in order to have the film shrunk and thus securely wrapping around an article to be packaged.

Conventionally, hot airflow is supplied from the top side of a hot airflow generation device. The hot air is guided downward to an article to be packaged by the heat-shrinkage film. The airflow then randomly bounces away from the article. Thus, uniformly and quickly heating the film can rarely be realized. In addition, articles to be packaged may have totally different shapes and dimensions. The one-way hot airflow generated and provided by the conventional hot airflow generation device is thus not capable to achieve high quality packaging.

Thus, it is desired to have a device for generating hot airflow that is applied to heat-shrinkage film in order to overcome the above problems.

SUMMARY OF THE INVENTION

An object of the present invention is to provide a hot airflow generation device comprising a casing inside which hot air is caused to continuously circulate for inducing uniform heating on an article to be packaged.

Another object of the present invention is to provide a hot airflow generation device comprising air flow guides for controlling direction and flow rate of hot air flowing toward an article to be packaged to provide excellent quality of packaging.

To achieve the above objects, in accordance with the present invention, there is provided a hot airflow generation device for supplying hot airflows toward a heat-shrinkage film wrapping around an article to heat and shrink the film, forming a package over the article. The hot airflow generation device comprises a casing defining a channel through which the article wrapped by the heat-shrinkage film is conveyed. A hood is arranged inside the casing and forms air passages with the casing. Each air passage forms an exit opening. The hood is comprised of walls forming an air intake port in communication with the air passages. An air fan is mounted to the hood for drawing air into the air intake port and driving the air into the air passages. Electric heaters are arranged inside the air passages for heating air flowing therethrough. Air that is drawn into the air intake port and driven through the air passages is heated by the heaters and becomes hot airflow that flow toward the article through the exit openings. The air bounces from the article and is drawn into the air intake port and the air passages again for circulation and being heated again. An airflow guide board is rotatably mounted in each air passage for controlling air flow rate and direction through the associated exit opening.

BRIEF DESCRIPTION OF THE DRAWINGS

The present invention will be apparent to those skilled in the art by reading the following description of preferred embodiment thereof, with reference to the attached drawings, in which.

DETAILED DESCRIPTION OF THE PREFERRED EMBODIMENT

Figure 1:
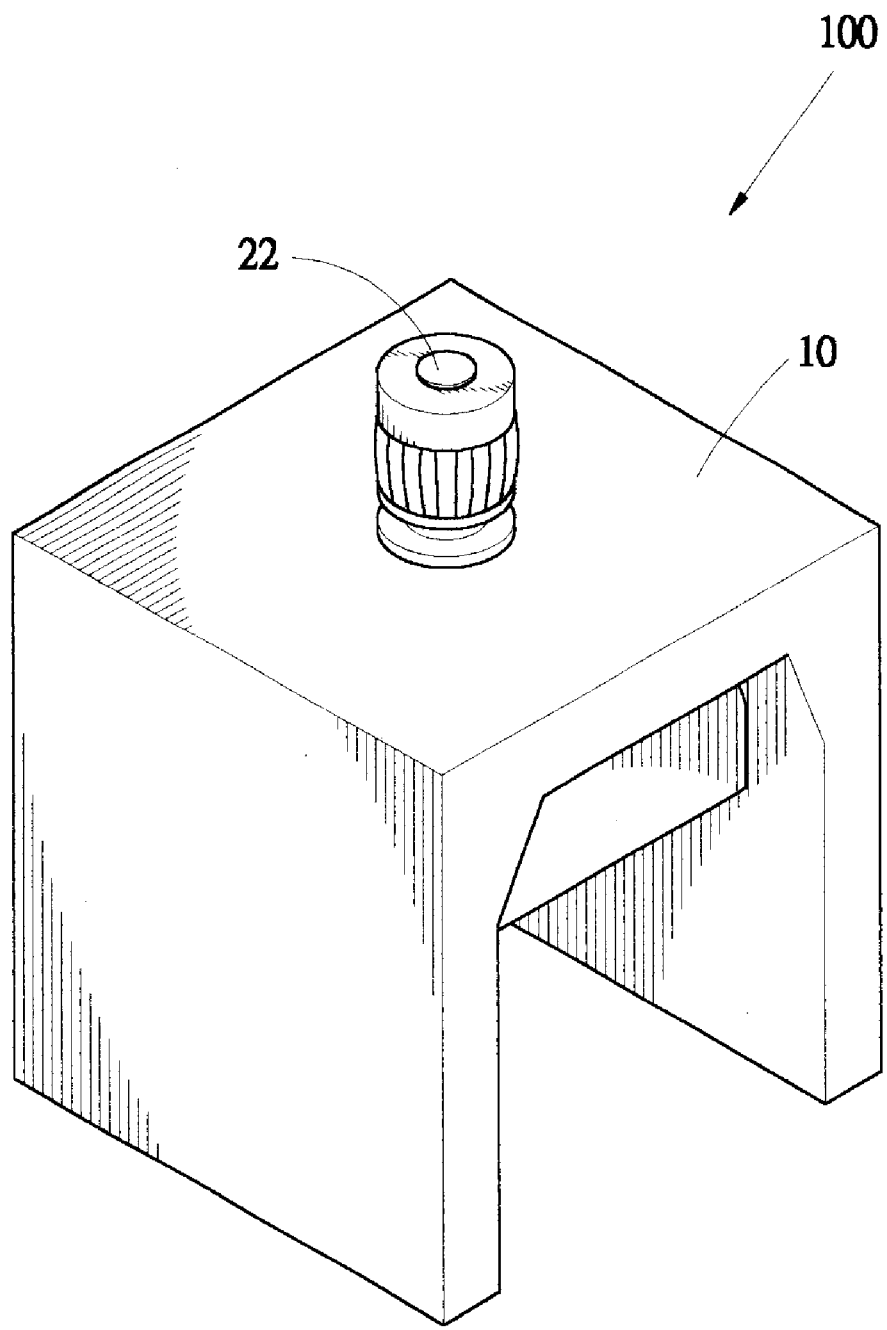
FIG. 1 is a perspective view of a hot airflow generation device constructed in accordance with the present invention.
Figure 2:
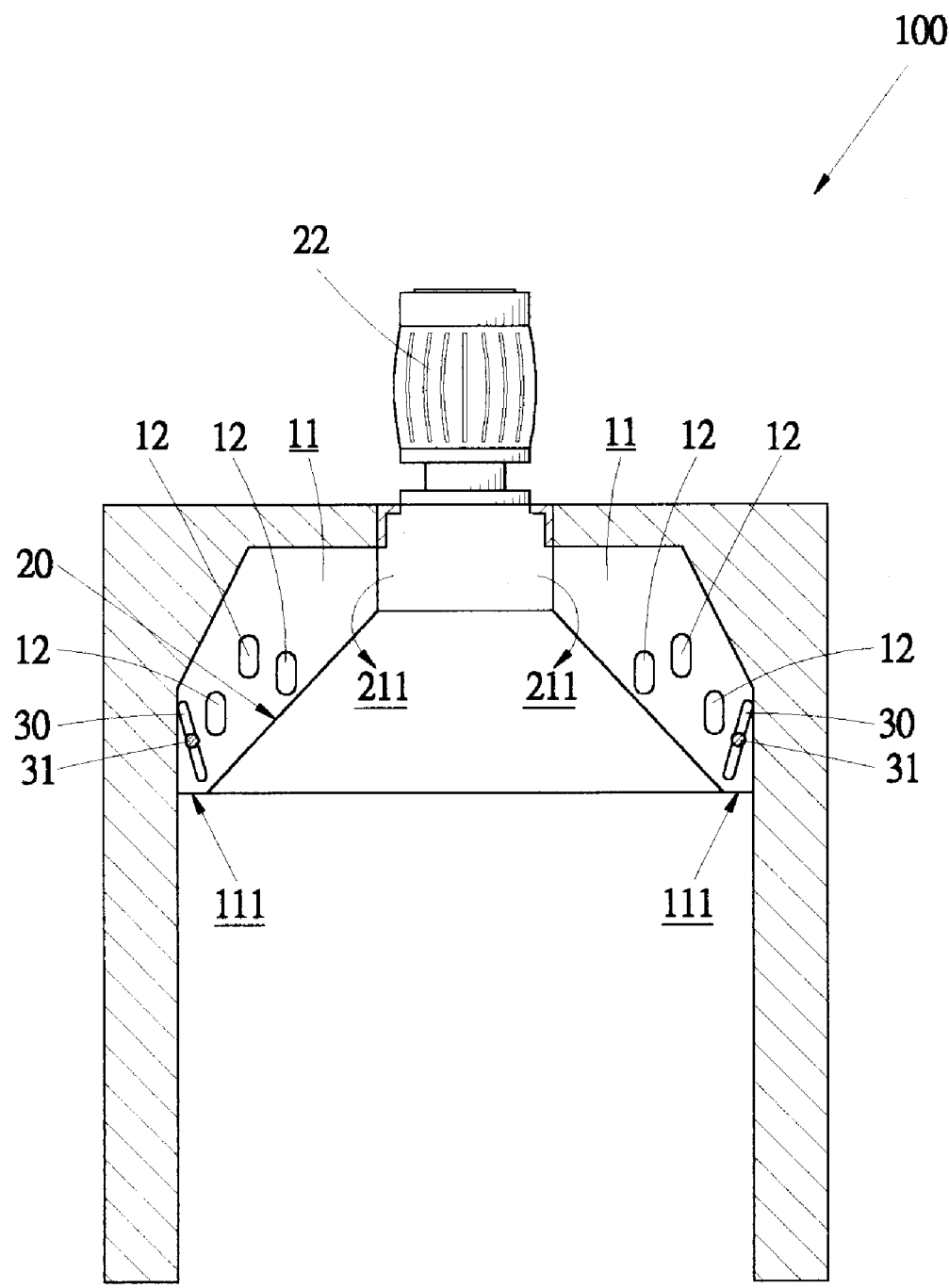
FIG. 2 is a cross-sectional view of the hot airflow generation device constructed in accordance with the present invention.
Figure 3:
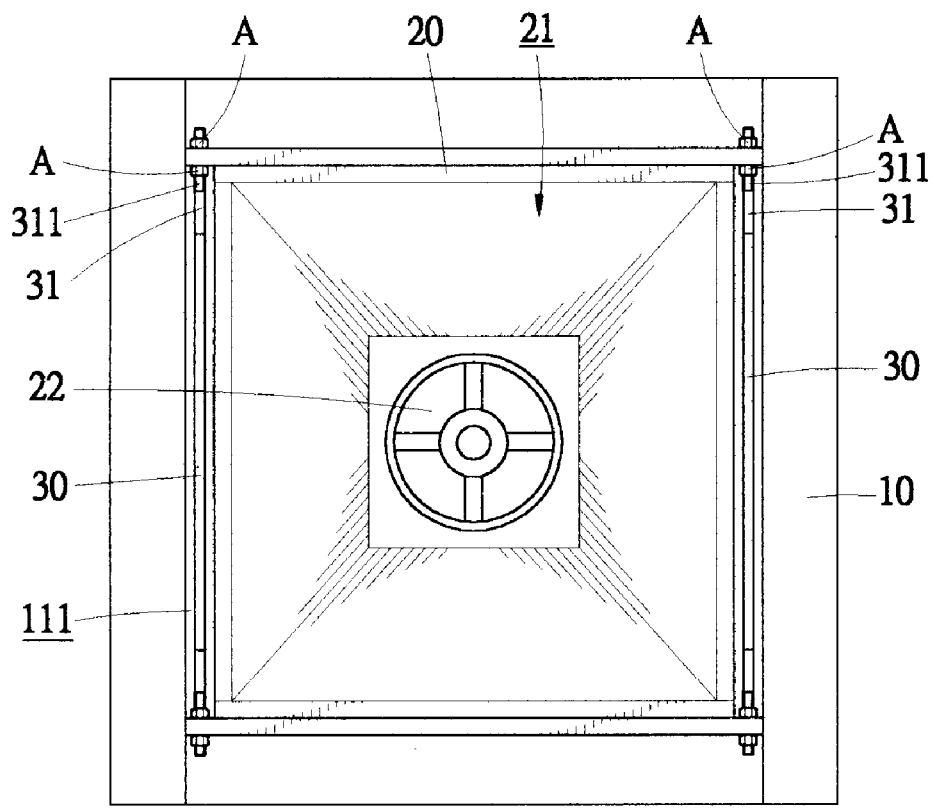
FIG. 3 is a bottom view of the hot airflow generation device of the present invention.
Figure 5:
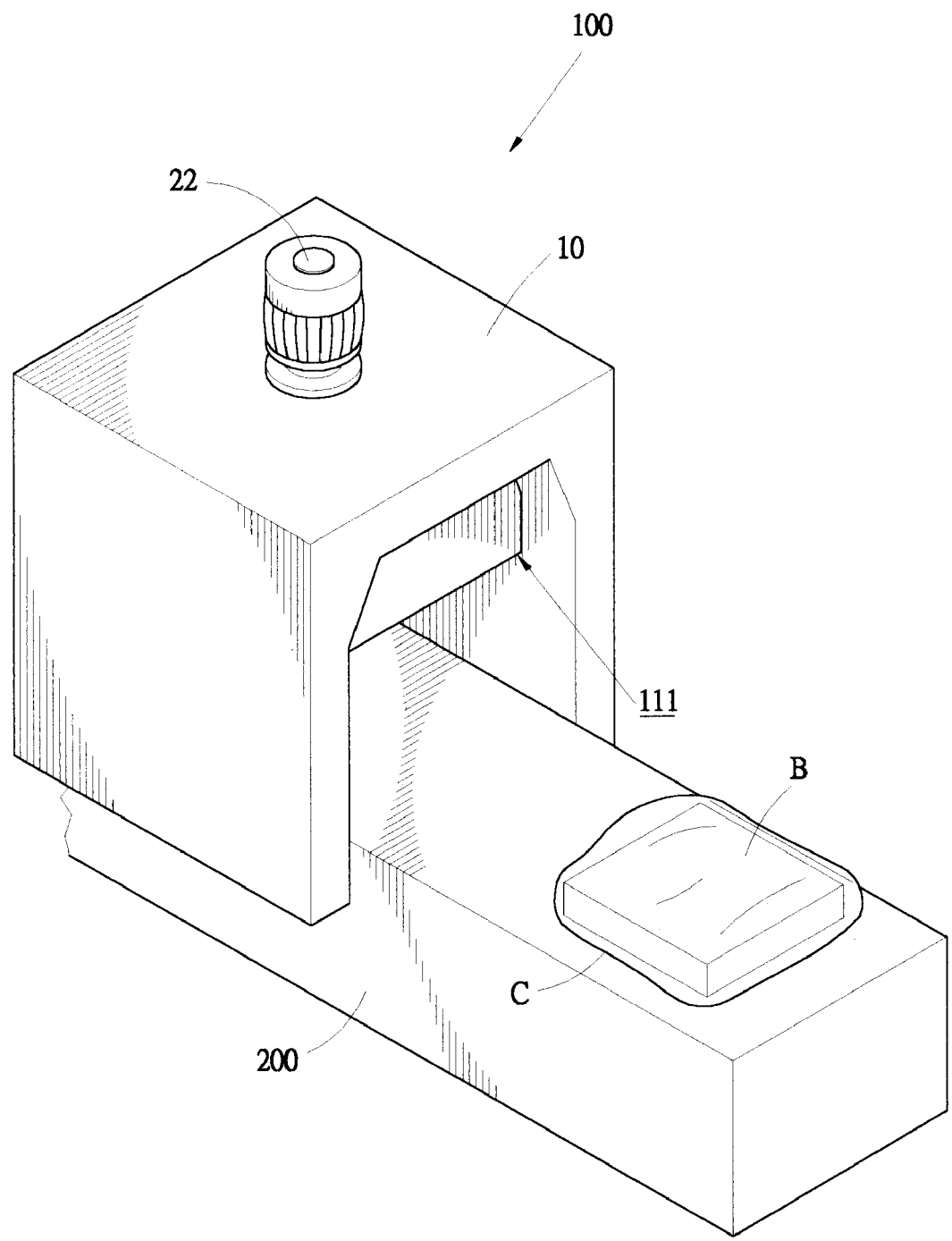
FIG. 5 is a perspective view showing an article on which a heat-shrinkage film wraps is conveyed into the hot airflow generation device of the present invention.
Figure 6:
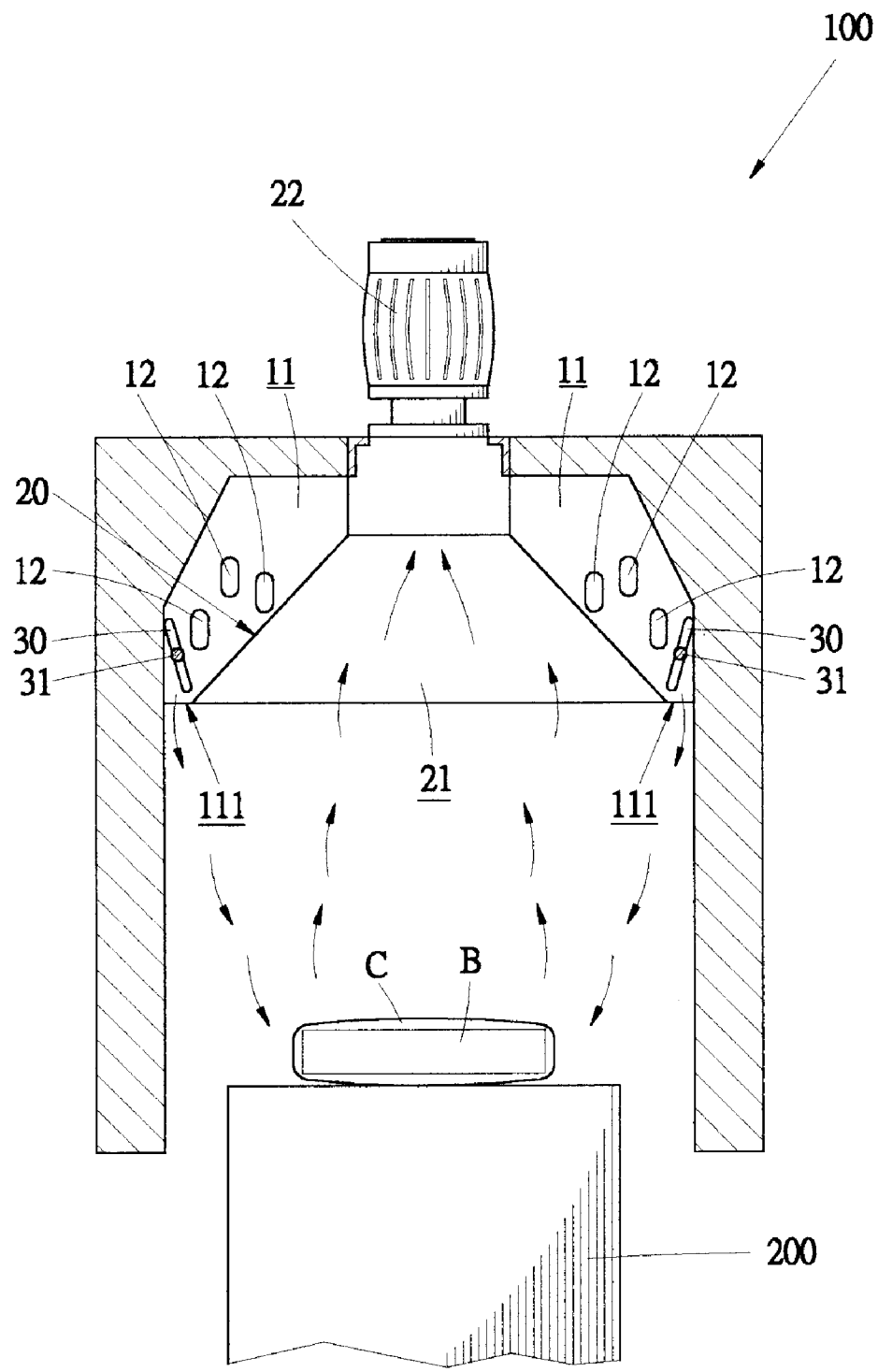
FIG. 6 is a cross-sectional view showing hot airflows generated by the hot airflow generation device of the present invention are guided toward the article to be packaged.

With reference to the drawings and in particular to FIGS. 1–3, a hot airflow generation device constructed in accordance with the present invention, generally designated with reference numeral 100, comprises a casing 10 defining a channel (not labeled) through which an article B to be packaged by a heat-shrinkage film C is conveyed (FIGS. 5 and 6). A hood 20 is arranged inside the casing 10 and attached to a top side of the casing 10. The hood 20 forms air passages 11 with the casing 10. Heaters 12, such as electric heaters, are arranged inside the passages 11 for heating air flowing through the passages 11. The passages 11 form exit openings 111 at lower sides thereof for blowing hot air into the channel through which the article B is conveyed. An airflow guide 30, preferably in the form of elongate boards, is arranged in each air passage 11, preferably close to the exit opening 111, for controlling airflow direction and flow rate through the passage 11.

The hood 20 can be of any shape and configuration, such as a pyramid as shown in the drawings, comprised of walls (not labeled) defining an air intake port 21. Openings 211 are defined in the walls of the hood 20 and are in communication with the passages 11. Air is thus drawn through the openings 211 into the passages 11 for circulation. An air-driving device 22, such as a fan-like device, is mounted on the top side of the air intake port 21 for drawing into the air intake port 21 and then into the passages 11 through the openings 211. The air flowing into the passages 11 through the openings 211 is heated by the heaters 12 to form the desired hot airflow.

Figure 4:
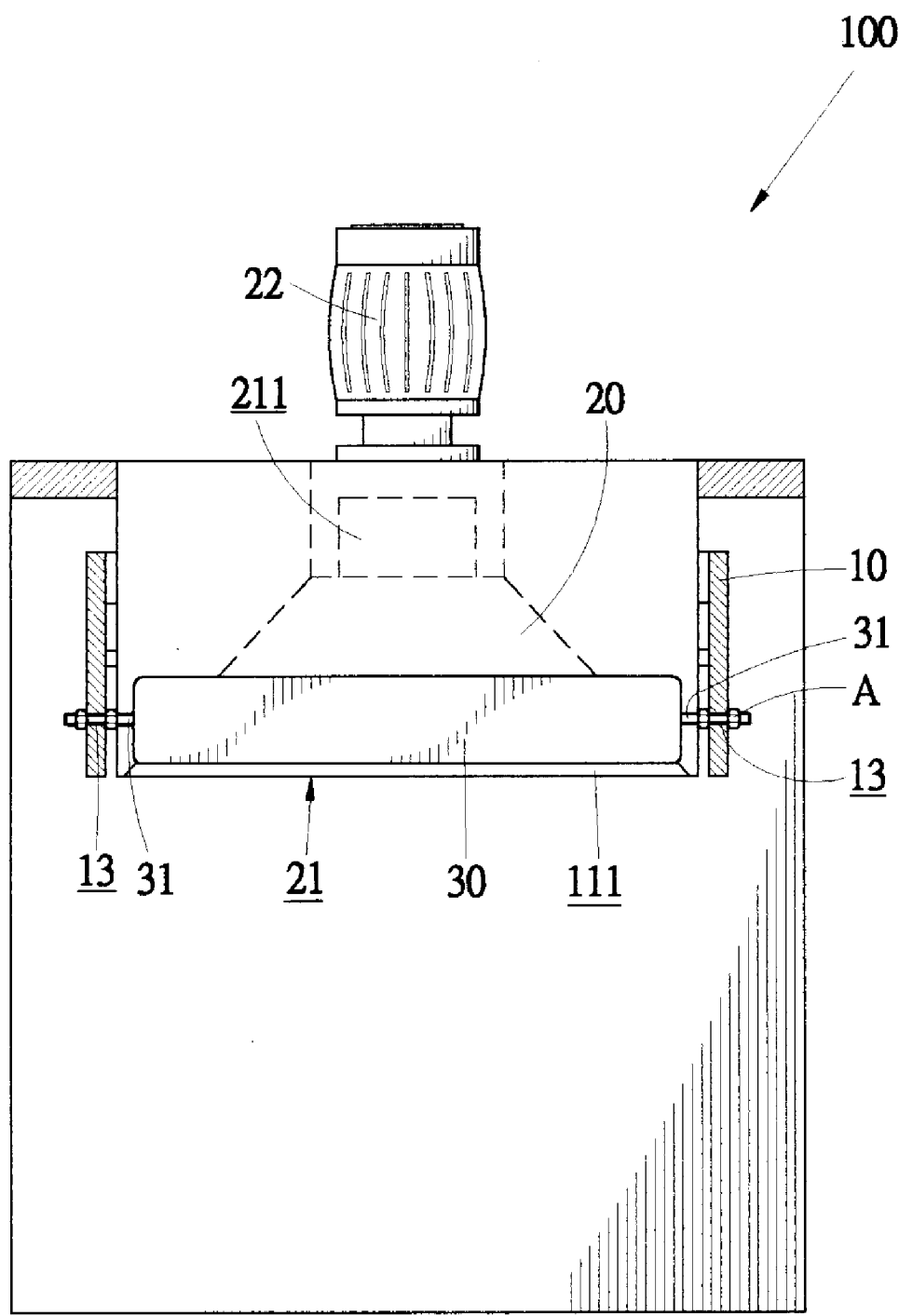
FIG. 4 is a side elevational view, partially sectioned, of the hot airflow generation device of the present invention.

Also referring to FIG. 4, the airflow guides 30 have end pivots 31 in which threading 311 is formed. The end pivots 31 extend through holes 13 defined in the casing 10 for rotatably supporting the airflow guides 30. The end pivots 31 are secured in positioned by nuts A engaging the threading 311. The threading engagement between the nuts A and the end pivots 31 of the airflow guides 30 allows an operator to change the direction of the airflow guides 30 whereby the exit openings 111 of the passages 11 can be closed to any desired extents and air flow rate through the exit openings 111 can be effectively controlled. Similarly, by changing the direction of the airflow guides 30, the direction of airflow through the exit openings 111 can be changed.

Also referring to FIGS. 5 and 6, articles B wrapped by heat-shrinkage films C are conveyed, such as by means of a conveyor 200, through the channel defined in the casing 10. Hot airflows are guided toward the article B through the exit openings 111 of the passages 11 for heating and shrinking the film C. In accordance with the present invention, the exit openings 111 are located on opposite sides of the channel whereby the hot airflow travels from both sides toward the article B as indicated by arrows in FIG. 6. The airflow bounces from the surface of the article B and is then drawn into the air intake port 21 by the air driving device 22 and thereafter into the passages 11 again through the openings 211, forming circulation of airflow inside the casing 10, allowing uniform and quick heating of the heat-shrinkage film C.

The direction of the airflow guides 30 can be changed in accordance with the shape and dimensions of the article B to be packaged in order to supply the hot airflow toward the article B in a preferred angle to efficiently heat the article B and also change the flow rate of hot air supplied to the article B and the film C.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A hot airflow generation device for supplying hot airflow to heat and shrink a heat-shrinkage film wrapping around an article, the hot airflow generation device comprising:

a casing defining a channel through which the article wrapped by the heat-shrinkage film is conveyed;

a hood arranged inside the casing and forming air passages with the casing, each air passage forming an exit opening, the hood comprising walls forming an air intake port in communication with the air passages;

an air driving device for drawing air into the air intake port and then into the air passages;

a plurality of heaters arranged inside the air passages for heating air flowing therethrough;

a plurality of airflow guides, each said airflow guide being arranged inside each said air passage for controlling air flow rate and direction through said associated exit opening; and, wherein air is drawn into the air intake port and driven through the air passages in which the air is heated to become hot airflow which flows toward the article through the exit openings, the air bouncing from the article and drawn into the air intake port and the air passages again for circulation and being heated again.

2. The hot airflow generation device as claimed in claim 1, wherein the airflow guide comprises a board, end pivots extending from the board to be rotatably received and supported in holes defined in the casing, threading being formed on the pivots for engaging nuts to selectively secure the board at a desired direction.

3. The hot airflow generation device as claimed in claim 1, wherein the hood has a substantially pyramid shape.

* * * * *